No. 673,371. Patented Apr. 30, 1901.
T. J. THORP.
STEEPER.
(Application filed Dec. 16, 1899.)
(No Model.) 2 Sheets—Sheet 1.

Witnesses:
C. E. Burnap
James Baird

Inventor:
Thomas J. Thorp
By Dyrenforth & Dyrenforth
Att'ys

No. 673,371. Patented Apr. 30, 1901.
T. J. THORP.
STEEPER.
(Application filed Dec. 16, 1899.)
(No Model.) 2 Sheets—Sheet 2.

Witnesses:
C. E. Burnap
James Baird

Inventor:
Thomas J. Thorp
By Dyrenforth & Dyrenforth,
Att'ys

UNITED STATES PATENT OFFICE.

THOMAS J. THORP, OF CORVALLIS, OREGON, ASSIGNOR OF ONE-FOURTH TO W. A. BUCHANAN, OF SAME PLACE.

STEEPER.

SPECIFICATION forming part of Letters Patent No. 673,371, dated April 30, 1901.

Application filed December 16, 1899. Serial No. 740,550. (No model.)

*To all whom it may concern:*

Be it known that I, THOMAS J. THORP, a citizen of the United States, residing at Corvallis, in the county of Benton and State of Oregon, have invented a new and useful Improvement in Steepers, of which the following is a specification.

My invention consists of an improved steeper for coffee and other beverages; and my object is to provide a device of this character of simple construction, handsome design, and equipped with automatically-acting valves.

Figure 1:
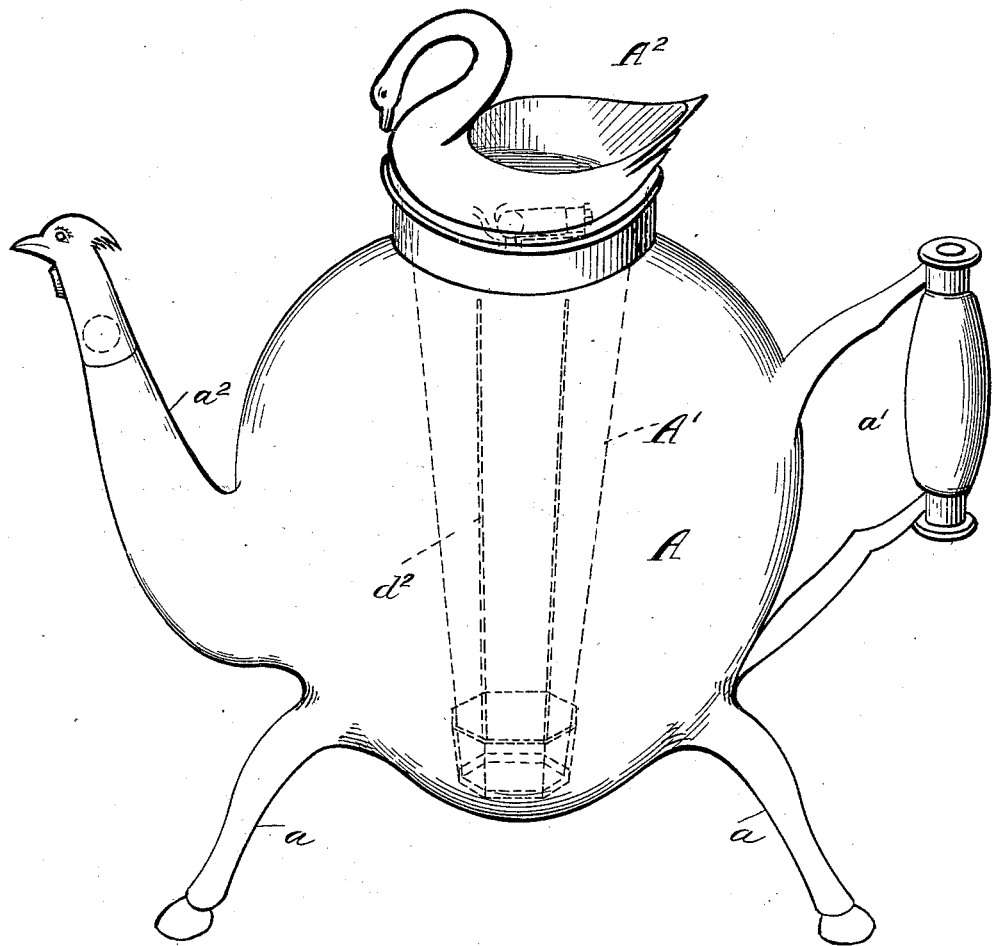
Figure 2:
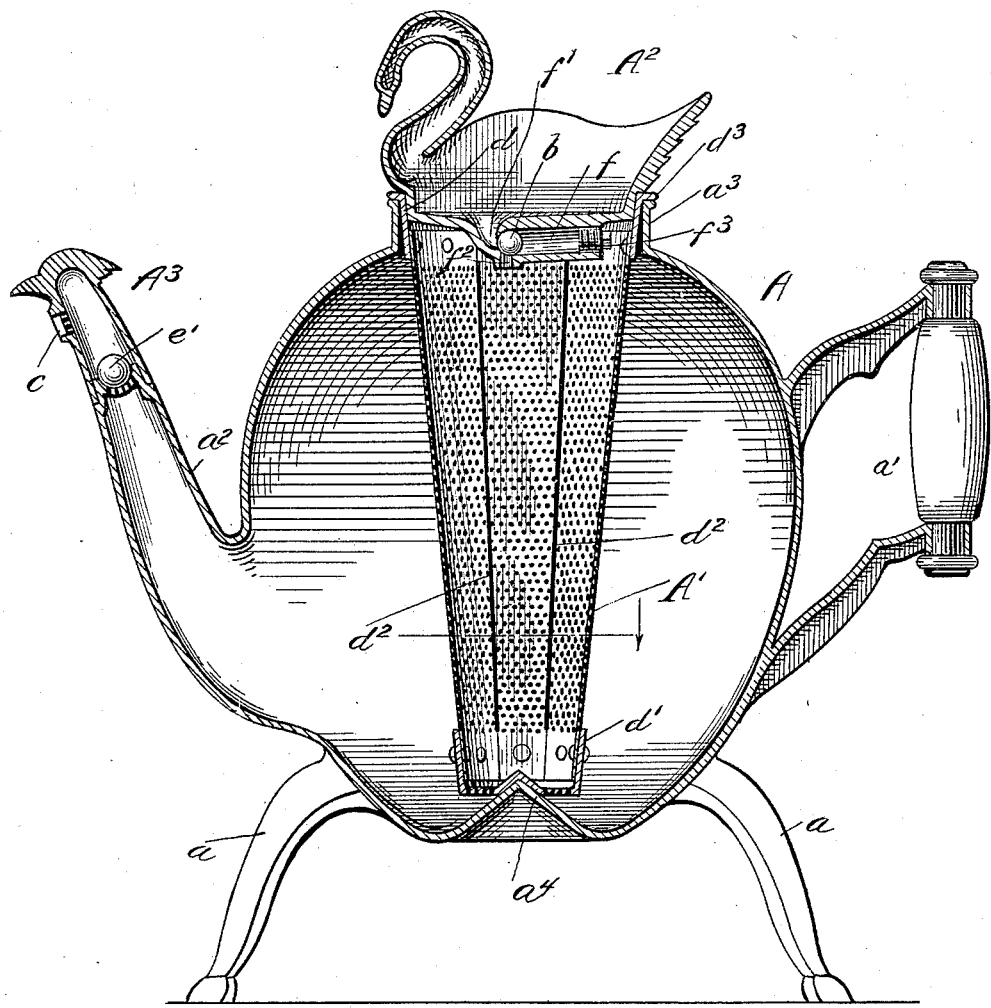
Figure 3:
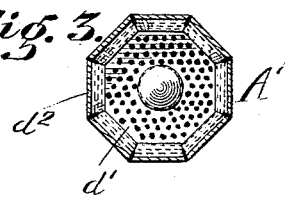

In the accompanying drawings, which illustrate my improved steeper, Figure 1 is a perspective view; Fig. 2, a vertical sectional view of the device, and Fig. 3 a horizontal section of a filter-cup employed.

In the preferred construction the principal parts are of aluminium, and comprise a body portion A, supported on legs $a$ and supplied with a handle $a'$, spout-section $a^2$, top flange $a^3$, and filter-cup centering-cone $a^4$; a filter cup or receptacle for tea or coffee A' of suitable formation to be properly centered and confined by the cone $a^4$ and flange $a^3$; a dished or funnel-acting top $A^2$, supplied with an automatic valve $b$, and a spout-section $A^3$, supplied with a discharge-opening $c$ and containing an automatic valve $c'$.

The receptacle A' is preferably of general octagonal form and comprises a top rim or band $d$, a bottom-forming perforated cup $d'$, and a perforated sheet-metal body portion provided with slots $d^2$ at the corners of the receptacle, said slots extending to the top and bottom attaching-margins of the sheet, as shown. It will be understood that the sheet metal is cut and shaped to fit at its upper margin into the band $d$ and at its lower margin into the cup $d'$, to which members it is secured, as by riveting. The band $d$ is shown provided with a flange $d^3$ for ease of removal of the receptacle. The slots $d^2$ are preferably fine enough to prevent escape of grounds.

The top $A^2$ preferably is of elongated dish shape and may conveniently have the outline of a swan's body facing the spout of the urn, as shown. The base of the top is provided with a hollow boss, forming a valve-chamber $f$, having an induction-port $f'$ and an eduction-port $f^2$, guarded by the ball-valve $b$. The boss is shown in a suitable location for forming the valve seat and runway. When thus formed, a plug $f^3$ is employed to stop the rear opening. The runway is inclined somewhat, so that the valve will always seek its seat. The channel $f'$ directs the water to the front side of the valve and forces the latter from its seat. The top fits within the upper portion of the cup A' snugly enough to prevent it from falling off when the vessel is tipped, as in pouring. As shown, the spout-section $A^3$ projects sufficiently beyond the opening $c$ to permit the ball $c'$ to leave the seat provided for it in the end of the spout-section $a^2$ and pass the opening $c$ when it is desired to pour out liquid. However, it is sufficient if the construction is such as to permit the valve to leave its seat and take a position where it will not obstruct the outflow of liquid.

The manner of use is evident from the foregoing description. Coffee (or other beverage-producer) is put into the receptacle A'. If desired, the coffee may be inclosed in a cloth bag before introducing it into the receptacle. Hot water is then poured into the dished top, from whence it passes the valve $b$ into the interior of the steeper. The valve $c'$ remains closed during this operation, except for permitting escape of air from the interior. The valve $b$ closes as soon as the water has passed to the interior. Thus the heat is confined within the vessel to give better results in steeping and the fumes and aroma are prevented from escaping. In decanting the liquid the valve $b$ remains closed and the valve $c'$ opens, as is evident.

Changes in details of construction within the spirit of my invention may be made.

What I claim as new, and desire to secure by Letters Patent, is—

1. In a steeper, the combination with a body portion provided with a spout, of a dished top for said steeper provided with a passage leading to the interior and with a rearwardly and upwardly inclined valve-runway, and a ball-valve in said runway and guarding said passage, substantially as and for the purpose set forth.

2. In a steeper, the combination with a body portion provided with a spout and a removable top, of a removable receptacle for coffee or the like, comprising a bottom and sides, the sides being formed from a piece of sheet metal suitably perforated and having corner-slots, substantially as and for the purpose set forth.

THOMAS J. THORP.

In presence of—
D. W. LEE,
F. J. MARTIN.